(12) United States Patent
Tanaka et al.

(10) Patent No.: US 6,421,202 B1
(45) Date of Patent: Jul. 16, 2002

(54) HARD DISK DRIVE MAGNETIC HEAD COATED WITH LOW SURFACE ENERGY MATERIAL

(75) Inventors: Hidetsugu Tanaka; Masayuki Kanamaru; Masahiro Nagayoshi, all of Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,921

(22) Filed: May 16, 2000

(30) Foreign Application Priority Data

Jun. 8, 1999 (JP) .......................................... 11-160711

(51) Int. Cl.$^7$ ................................................ G11B 5/40
(52) U.S. Cl. ..................................... 360/122; 360/235.2
(58) Field of Search ............................. 360/122, 235.1 360/235.2, 235.3

(56) References Cited

U.S. PATENT DOCUMENTS

| | | | | |
|---|---|---|---|---|
| 4,583,145 A | * | 4/1986 | Monnich et al. | 360/135 |
| 4,863,809 A | * | 9/1989 | Brar et al. | 428/623 |
| 5,102,731 A | * | 4/1992 | Takimoto et al. | 347/105 |
| 5,386,400 A | * | 1/1995 | Nakayama et al. | 369/13 |
| 5,768,056 A | * | 6/1998 | Boutaghou et al. | 360/235.1 |
| 5,820,964 A | * | 10/1998 | Nakakawaji et al. | 360/235.1 |
| 5,909,337 A | * | 6/1999 | Tyndall, III | 360/97.01 |
| 6,249,403 B1 | * | 6/2001 | Tokisue et al. | 360/235.2 |

FOREIGN PATENT DOCUMENTS

| | | | |
|---|---|---|---|
| JP | 59162613 A | | 9/1984 |
| JP | 61087209 | | 5/1986 |
| JP | 6-259911 | * | 9/1994 |
| WO | WO 94/08334 | | 4/1994 |
| WO | WO 97/22119 | | 6/1997 |

* cited by examiner

Primary Examiner—David L. Ometz
(74) Attorney, Agent, or Firm—G. Marlin Knight; Bracewell & Patterson, L.L.P.

(57) ABSTRACT

At least part of the surface of a read/write element of the magnetic head surface is coated with low surface energy materials. The low surface energy materials have sufficient humidity resistance, wetting resistance, and hydrophobicity to repel water from the coated surfaces. Such properties yield improved corrosion resistance for the coated surfaces. The low surface energy materials include fluorocarbon compounds (FCOC) and special materials such as perfluoroalkylpolyoxyethyleneethanol. The low surface energy materials are coated on the magnetic heads as thin films. The thin films have a thickness in the range of 5–100 angstroms, but are preferred in the range of 10–20 angstroms. The thin films provide sufficient adhesion on and corrosion protection of the heads without decreasing their performance.

14 Claims, 4 Drawing Sheets

"Complete" Wetting $\theta = 0°$
$\gamma t < \gamma s$

"Good" Wetting $0° < \theta < 90°$
$\gamma t > \gamma s$

"Poor" Wetting $90° > \theta > 180°$
$\gamma t >> \gamma s$

HARD DISK DRIVE MAGNETIC HEAD COATED WITH LOW SURFACE ENERGY MATERIAL

BACKGROUND OF THE INVENTION

1. Technical Field

The present invention generally relates to disk recording devices, and more particularly to technology for protecting magnetic heads from corrosion by applying a coating to magnetic heads used in hard disk drives.

2. Description of the Related Art

In recent years, the recording capacity of disk recording devices has increased very rapidly. This is significant in typical magnetic recording hard disk drives (HDD). As the size of HDDs has decreased their storage density has increased. The high performance/high sensitivity write (recording) and read elements used in HDDs are susceptible to environmental influences. In particular, corrosion is a critical issue in maintaining HDD reliability.

One of the main causes of corrosion is believed to be water that is present within the HDDs. Although the water can be removed by placing a drying agent inside the HDD, the absorbency of drying agents is limited. Thus, drying agents have the drawback of being unable to serve for long periods of time.

Another prior art solution suggested coating the surfaces of the magnetic disks with a lubricant. The lubricant is transferred and supplied to the read/write elements and substantially covers areas susceptible to corrosion. However, this approach also had the drawback of being unable to reliably serve for long periods of time, as it is difficult to ensure retention of the lubricants for extended periods.

Another solution uses protective coating layers on the read/write elements to improve abrasion resistance. However, such coatings are so thick that they reduce the recording properties of the read/write elements. It is not yet possible to form a thin, protective film coating on the elements without diminishing their recording properties.

Yet another solution uses highly corrosion-resistant materials to form the read/write elements themselves. Unfortunately, this solution makes it difficult to ensure sufficient corrosion resistance while maintaining adequate function for reading and writing to the disks.

SUMMARY OF THE INVENTION

At least part of the surface of a read/write element of the magnetic head surface is coated with low surface energy materials. The low surface energy materials have sufficient humidity resistance, wetting resistance, and hydrophobicity to repel water from the coated surfaces. Such properties yield improved corrosion resistance for the coated surfaces. The low surface energy materials include fluorocarbon compounds (FCOC) and special materials such as perfluoroalkylpolyoxyethyleneethanol. The low surface energy materials are coated on the magnetic heads as thin films. The thin films have a thickness in the range of 5–100 angstroms, but are preferred in the range of 10–20 angstroms. The thin films provide sufficient adhesion on and corrosion protection of the heads without decreasing their performance.

It is the main purpose of the present invention to ensure reliability of HDDs by improving corrosion resistance of magnetic heads in HDDs.

It is another purpose of the present invention to select suitable materials for highly corrosion resistant coating.

It is a further purpose of the present invention to form thin films with correct thickness as the coating for magnetic heads.

DETAILED DESCRIPTION OF ILLUSTRATIVE EMBODIMENT

Figure 1:
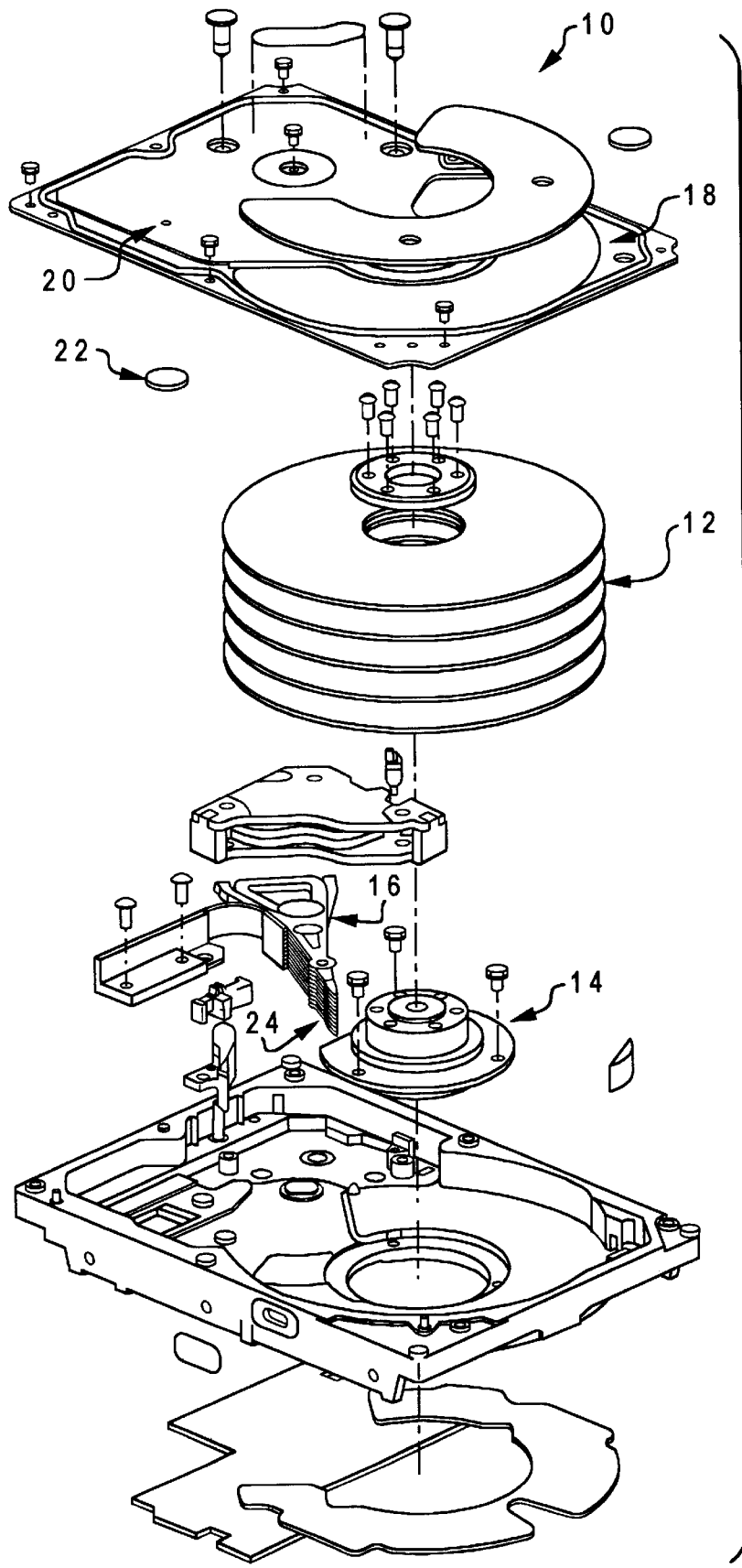
FIG. 1 is an exploded perspective view of a hard disk drive constructed in accordance with the invention.

FIG. 1 is an exploded perspective view of a hard disk drive (HDD) 10. In HDD 10, a plurality of disks 12 are rotated as a whole by a spindle motor 14 during operation. A carriage assembly 16 is included as an element configuring HDDs, and the carriage assembly 16 crosses over disks to access disks 12. This movement of the carriage allows data to be written into and read from the desired parts of the disks 12.

There are small holes 20 in the top cover 18, and a breather filter 22 is placed to cover the small holes 20, which can remove dust from outside the HDDs. Therefore, air can go into and out of HDD through these small holes 20 and the breather filter 22. For example, a HEPA filter is used as the breather filter 22. Thus, environment outside HDD is transferred inside.

Figure 2:
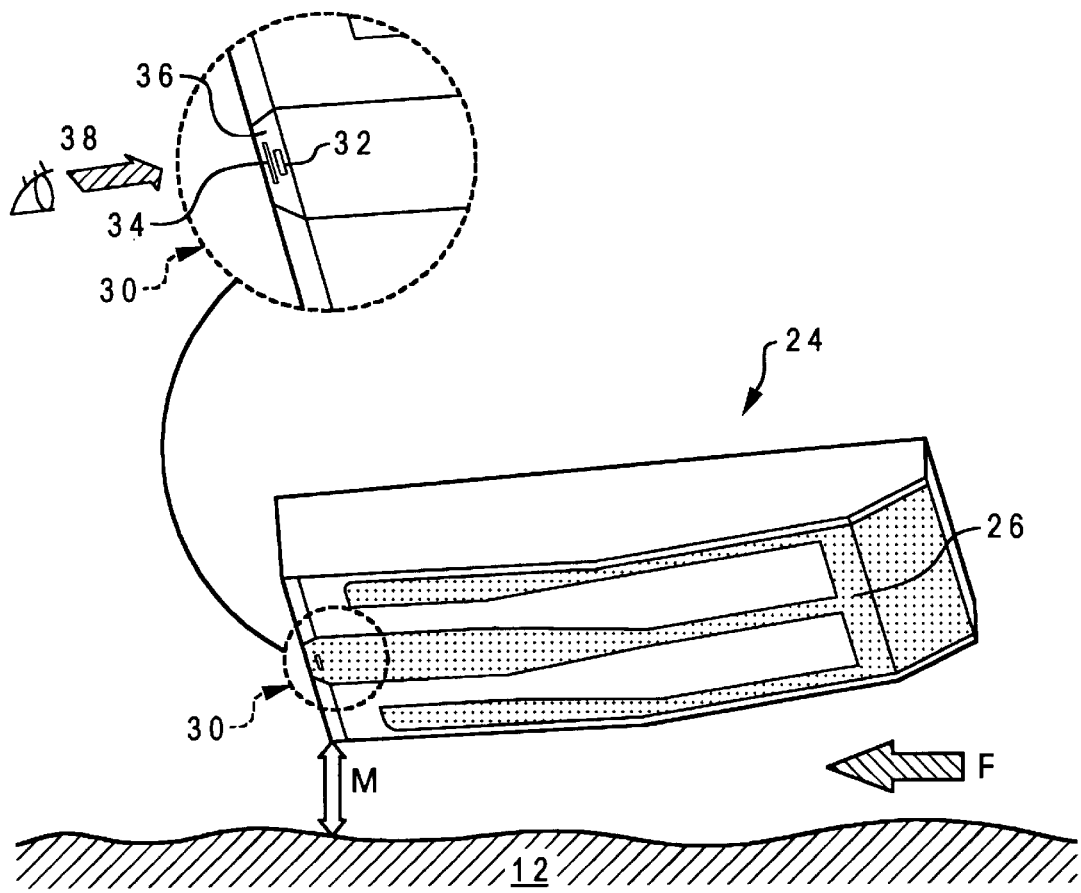
FIG. 2 is a perspective view of a slider of the hard disk drive of FIG. 1 while "flying" above a disk.

As shown in FIG. 2, a slider 24 is attached at the end of the carriage assembly 16 (FIG. 1). For example, AlTiC is used as a material for slider 24. Flow of the air F caused by rotation of disk 12 flows upstream to downstream of the slider, forming air bearing surface (ABS) 26 and keeping the slider 24 floating above the disks 12. As the slider 24 is typically tapered or chamfered so that its upstream side is higher than its downstream side, the downstream side becomes closest to the disks 12.

A write/read element 30 is attached on downstream side of the slider, and the data is written into or read from disks 12 through electromagnetic effect M between this element 30 and the surface of disks 12. For full function of the electromagnetic effect M, it is preferable that the distance between the write/read element 30 and the disks 12 is as short as possible. This is because electromagnetic effect M can be localized at the surface of disks 12 to be utilized at high density. However, physical corrosion of the write/read element 30 and the rotating disks 12 is not allowed.

In FIG. 2, vicinity of the write/read element 30 is enlarged and shown more precisely. As shown here the write/read element 30 is often used separately as a write element 32 and a read element 34. Furthermore, in some cases materials 36 other than the material (AlTiC) for the slider 24 are located on a part of the surface of the slider 24 as a material to serve as a foundation for the write/read element 30. There may be a similar case where vicinity of this element 30 is surrounded by materials 36 other than the material for the slider 24, even though they do not serve as the foundation for this.

In either case, the "surface" of the write/read element 30 is exposed to ABS as shown in the figure, for full function of the electromagnetic effect M. However, it has not necessarily to be exposed directly to ABS and it may be enough that it is exposed to the downstream side of the slider, for example even to the rear side 38 (behind the scene in the figure, though can be seen from the direction depicted by an eye and an arrow).

In the description of the present invention, a slider including either write element 32 or read element 34 is called "magnetic head" for convenience. Typically, high permeability alloy is used for the write elements 32 and alloy utilizing magnetic resistance (MR) effect is used for the read elements 34. Thus, either element includes metal parts. As these metal parts are necessarily exposed to surfaces of ABSs, they are susceptible to corrosion by the air flow F, etc., and once corroded, the electromagnetic properties are significantly deteriorated. Especially reduction in output of reading signals from the read element 34 is significant. Also, the write element 32 cannot give the disks enough electromagnetic effect, resulting in poor write in some cases.

When humidity increases inside the HDDs, surfaces of these write/read elements 30 become more apt to be exposed to humidity. This causes significant corrosion, as described above. Small amounts of corrosive gases generated within HDDs are believed to be related to other causes of corrosion. Generation of such gases may be related to volatile components generated from parts themselves in the HDD, or related to aging of the HDD parts. Actually corrosion is believed to proceed due to electrochemical processes related to variety of those causes. In addition, high temperature inside HDDs will further enhance corrosion reactions. High temperature will also strongly cause generation of corrosive gases.

A surface energy index is an indication of resistance of a given surface against water. According to this index, the degree of humidity resistance or wetting resistance, (Anti Wetting) a degree of rejecting water, may be known from the condition of water on a reference surface.

Figure 3A:
FIGS. 3A–3C are schematic views of three wetting states on a reference surface for illustrating surface energy.
Figure 3B:
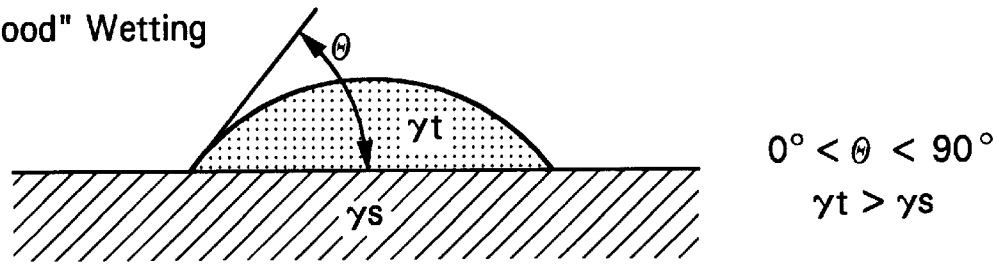
Figure 3C:
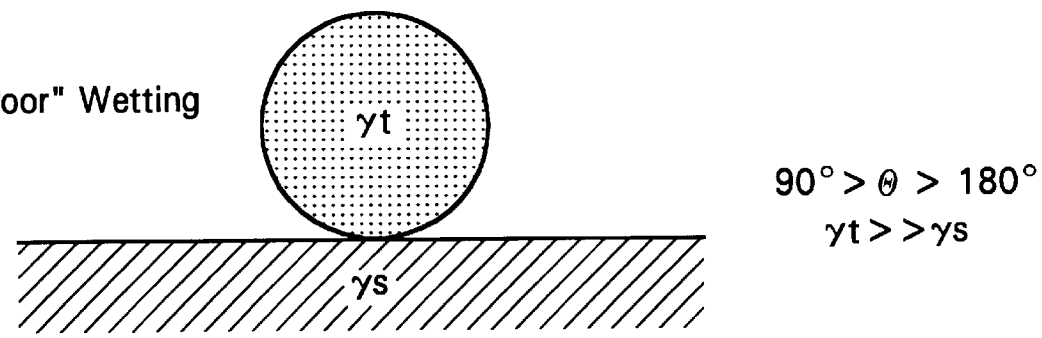

FIGS. 3A, 3B, and 3C are schematic views of three categorized states of water on a surface. The parts of the material that are dotted represent states of water, and the parts of the material that are shaded represent the reference surfaces. The states of water are "complete" wetting for FIG. 3A, "good" wetting for FIG. 3B, and "poor" wetting for FIG. 3C. These expressions are only for convenience. Those skilled in the art may as well use other expressions. From the point of view that it is good to be wet, FIG. 3A is preferable and it is unpreferable to be closer to FIG. 3C. On the contrary from the point of view that degree of wetting resistance is the issue as in the present invention, FIG. 3C is preferable and it is not preferable to be closer to FIG. 3A. This may be apparent form the meaning of terms "hydrophobicity and water repellence."

The states of FIGS. 3A, 3B, and 3C are categorized by contact angles $\theta$. Contact angle $\theta$ is defined as the angle $\theta$ formed between the tangent line and the reference surface at the contact point of water in the form of a drop of water and the reference surface. The contact angle $\theta$ is determined by the following equation using surface energy of water $\gamma_t$ and the surface energy of reference surface $\gamma_s$. $\Theta$ in the equation is an experimental value.

$$\cos\theta = 2\Theta(\gamma_t/\gamma_s)^{1/2} - 1$$

Contact angle $\theta$ can be determined experimentally by taking the image of a drop of water in a CCD camera and processing the image. This equation shows that it is preferable from the point of view of humidity resistance or wetting resistance that the surface energy of the reference surface $\gamma_s$ is small enough as compared with the surface energy of water $\gamma_t$ as far as the latter is constant. The surface energy of water is $\gamma_t = 72.2$ erg/cm². On the other hand when the material of the reference surface is alumina ($Al_2O_3$: aluminum oxide), the surface energy of alumina is $\gamma_s = 169$ erg/cm².

The reason why the surface energy of alumina is the issue will be mentioned here. In other words, it is the reason why the write/read element 30 which must be protected from corrosion is not the direct issue as the reference surface. Although vicinity of the write/read element 30 is surrounded by other materials 36 in some cases as described above, the reference surface here corresponds to the other material 36 which is comprised of alumina (FIG. 2).

Thus, in order to evaluate humidity resistance, it is more reasonable to focus on the surface energy of alumina that occupies most of the surface area. Exposed areas of the write element 32 and read element 34 will total only to- a very small exposed area. It is noted that the exposed areas of the write element 32 and read element 34 in FIG. 2 are exaggerated to look bigger for convenience of illustration. In other words, it is reasonable to evaluate the contact angle $\theta$ at the contact points of water and alumina.

In the present invention, coating was formed as a substitute for substrate surface to reduce surface energy of the surface of the substrate, and the coating was provided with humidity resistance and wetting resistance. FCOCs (fluorocarbon compounds) were selected as the suitable material for the thin film. A material containing perfluoroalkylpolyoxyethyleneethanol was selected as an example of FCOCs (fluorocarbon compounds). The surface energy of the thin film material was found to be $\gamma_s = 12-15$ erg/cm². However, even lower surface energy is expected to be realized by adding more perfluoroalkylpolyoxyethyleneethanol. Lower limit even closer to zero can be experimentally estimated to exist. Those skilled in the art may easily achieve such modification. Thus, the selected materials may be utilized as-optimum anti wetting agents. As the surface energy of alumina ($Al_2O_3$: aluminum oxide) is $\gamma_s = 169$ erg/cm² as described above, it is understood that substitution with far lower surface energy reference surface is attained by this coating.

Another advantage of the FCOCs (fluorocarbon compounds) is that they can form thin films as solid. The thin film as solid has been assured experimentally to retain adhered to surfaces for a long time. As actual formation of thin films, processes using dipping-and-drawing and plasma CVD were carried out, and FCOC was confirmed to be effective in both processes. Description of these processes is omitted since those skilled in the art may easily add and reproduce them. Also, those skilled in the art may easily adopt other formation processes such as sputtering, vapor deposition, and coating. Also the process may be developed to realize smoother surface by changing coarseness or the feature of the surface using physical surface treatment methods such as ion beam etching.

In the present invention it was found that coating of perfluoroalkylpolyoxyethyleneethanol is preferably formed into thin films with the thickness of 5–100 angstroms. Optimum range of thickness is determined by following reasons. If the thin film is too thin, enough effect of corrosion resistance may not be expected. Also some parts may be left uncovered by the thin film due to technological limitation of thin film formation. Experiments showed that thickness of at least 5 angstroms is necessary.

On the other hand, if the thin film is too thick, function of the magnetic head is damaged during operations of the HDDs. Thus the extra thickness will substantially reduce the allowance in the distance between disks 12 and the write/read elements 30. This situation is undesirable since it is important to secure electromagnetic effect M (FIG. 2) by reducing the distance between them as described above. Therefore, a limitation in thickness is also necessary. Experiments showed that thickness of 100 angstroms is realized in RDDs presently. Needless to say that strong adhesion for a very long period may be attained with such thickness. A range of 10–20 angstroms was found to be more preferable by narrowing the optimum thickness range, taking in consideration the balance between such limitations of thinness and thickness.

As the range for thin film formation, it is enough to cover all the surface in which the record/read elements 30 are exposed. That is, the range will be sufficient where the purpose of the present invention, namely, hydrophobicity and water repellence are expected. On the other hand, it is more difficult to try to form thin films only on these surfaces, because these surfaces are extremely small exposed areas and do not have simple features as shown enlarged and more precisely in FIG. 2.

Thus, in the present invention, thin film is formed so that some parts of the other materials 36 where alumina is used are also coated. This is in order to expect enough hydrophobicity and water repellence for the exposed surfaces of the write element 32 and the read element 34. This shows that it is appropriate to take the surface energy of alumina as an object of comparison in evaluating humidity resistance. It is because the contact angle $\theta$ is to be evaluated at the contact point with alumina. Of course it is not necessary to form thin film on parts of the write element or the read element, if the parts are already provided with enough corrosion resistance.

As depicted in FIG. 1, an entire HDD was left in a temperature-humidity chamber out of operation, in order to examine adhesive effect of the thin film. As the air can go into and out of the HDD as described above, the environment outside HDD is transferred inside. Generally, temperature and humidity have significant accelerability for promoting reactions. Especially humidity above between 80% and 90%. RH (relative humidity) shows extraordinary acceleration. Humidity was set to be 90% RH (relative humidity), and temperature was set to be 50° C. Humidity of 90% RH is a condition in which dew formation is easy, and in which it is highly probable for water vapor or water to contact surfaces. Both the humidity and temperature conditions are fairly severe. For example, an accelerative examination under such a condition for a week has the significance of assuring that the object may be used under ambient environment for about 5 long years.

Figure 4:
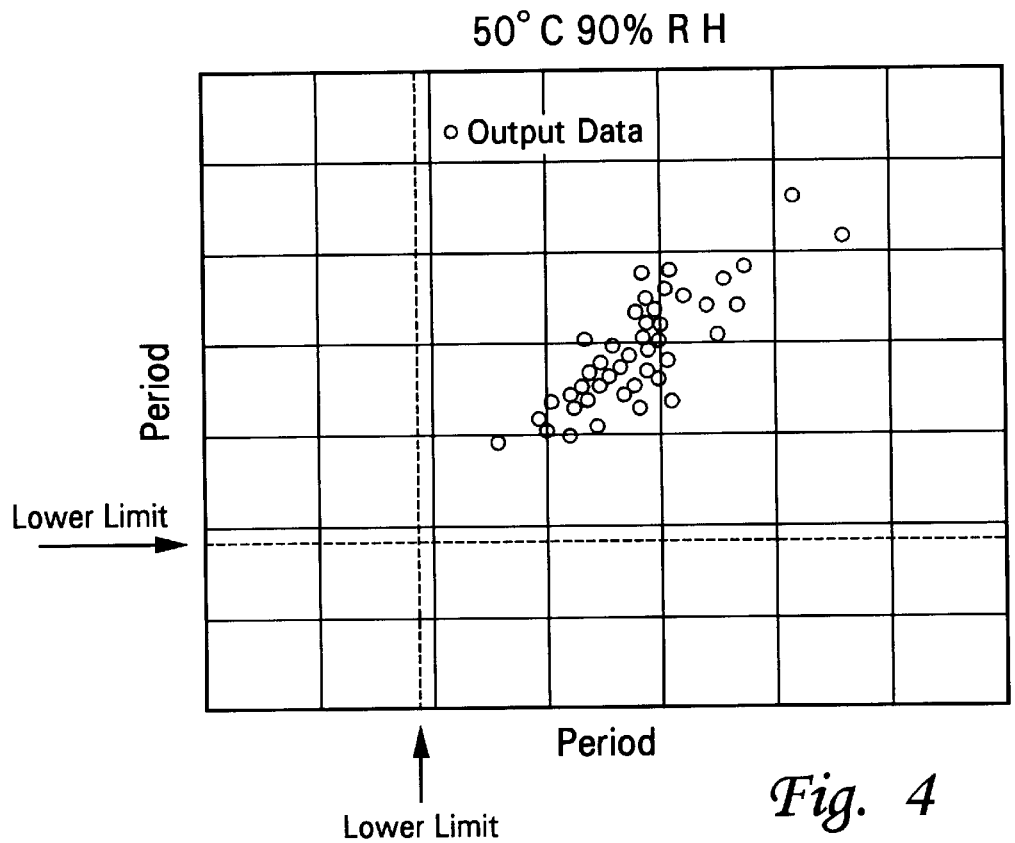
FIG. 4 is a plot showing output data obtained from magnetic heads coated in accordance with the invention while left standing under a high temperature and high humidity environment for periods A and B.

The data points in the graph of FIG. 4 show output value data obtained from read elements 34 of the magnetic heads. Coating of the present invention is formed on each magnetic head. The horizontal axis represents the output value data obtained from each magnetic head left standing for the period A of more than a week, and the vertical axis represents the output value data obtained from each magnetic head left standing for the period B which is twice the period A. Thus, this graph correlates the data after standing for the period A and the data after standing for the period B. As an evaluation, output values above the lower limit are estimated to assure the performance. All the dots are shown to be above the lower limit both in the horizontal and vertical axes. Thus, it was confirmed that the reliability of HDDs was secured by using magnetic heads coated with the thin film of the present invention.

Figure 5:
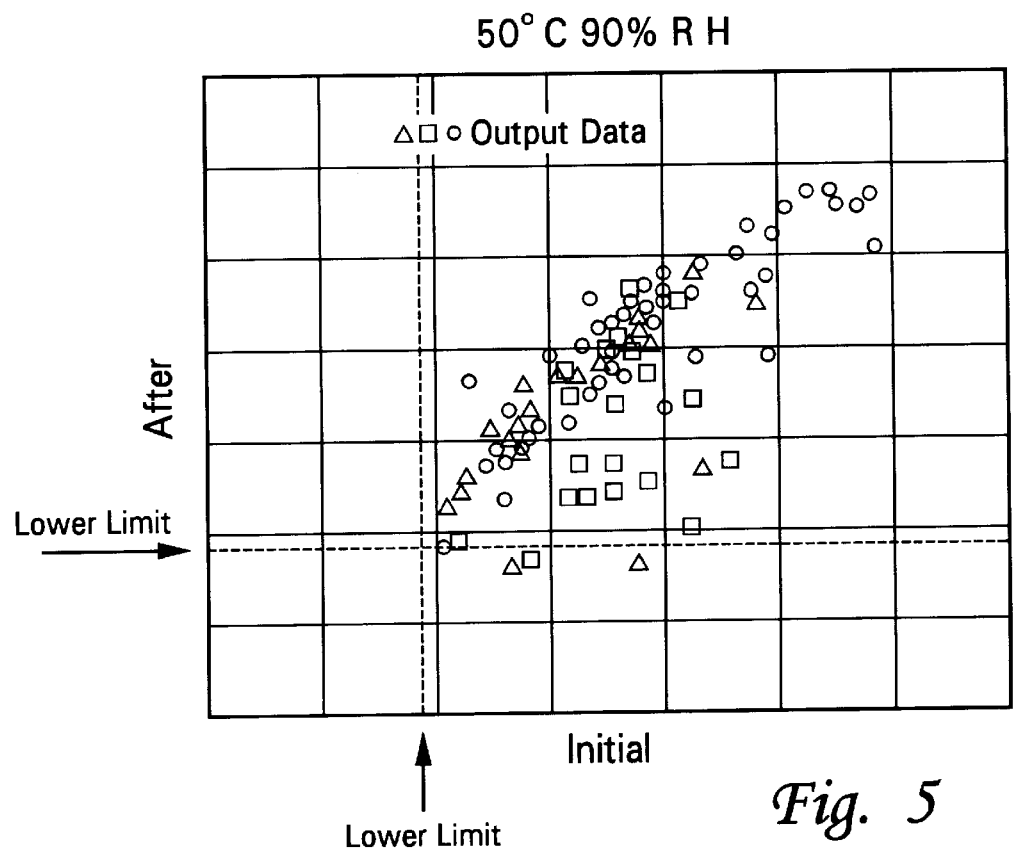
FIG. 5 is a plot showing output data obtained from prior art, uncoated magnetic heads used in a conventional technology at an initial stage before exposure to a high temperature and high humidity environment, and then after left standing under a high temperature and high humidity environment.

The dots in the graph of FIG. 5 show the result of an examination of magnetic heads used in conventional technologies under a high humidity and high temperature condition similar to FIG. 4. However, coating of the present invention was not formed here. And the horizontal axis of this graph represents data of output value obtained from magnetic heads at the initial stage before exposed to high temperature and high humidity environment (different from FIG. 4). Further the vertical axis of this graph represents output data from magnetic heads after standing for the period A (different from FIG. 4 in which the vertical axis represents data of the period B).

In case of magnetic heads of conventional technology shown in FIG. 5, 4% of the dots were below the lower limit already after standing for the period A. The ratio 4% can be found from the number of dots below the lower limit of the vertical axis. Thus, influence of corrosion is considered to have already occurred after standing for the period A. Although not shown as a graph, 20% of the dots were below the lower limit according to the output data obtained from magnetic heads left standing under a high temperature and high humidity environment for further period A (namely total of period B). After this accelerative examination, the surface was physically examined to see whether the formed thin film coating still remained. Namely the adhesive power of the coating formed was confirmed. As a result, detachment to be functionally problematic inside HDDs was not confirmed, showing enough adhesive power for a long period.

Though the present invention has been explained in relation to magnetic disk elements, those skilled in the arts may easily achieve application of the present invention for other disk record elements such as photomagnetic record elements or phase transition type record elements, and to the heads used in them. Magnetic heads coated by low surface energy materials according to the present invention was found to be very excellent in corrosion resistance. Reliability of HDDs is secured by this.

What is claimed is:

1. A magnetic head having at least a part of a surface thereof coated with materials having a low surface energy; and wherein the materials are fluorocarbon compounds containing perfluoroalkylpolyoxyethyleneethanol.

2. The magnetic head of claim 1 wherein the surface energy of said materials with low surface energy is in the range of 12–15 erg/cm$^2$.

3. The magnetic head of claim 1 wherein the coating of said materials with low surface energy is in the range of 5–100 angstroms.

4. The magnetic head of claim 1 wherein the coating of said materials with low surface energy is in the range of 10–20 angstroms.

5. The magnetic head of claim 1 wherein the magnetic head is a write element.

6. The magnetic head of claim 1 wherein the magnetic head is a read element.

7. A carriage assembly having a magnetic head selected from a group consisting of a read element and a write element, wherein the magnetic head has at least a part of a surface thereof coated with materials having a low surface energy; and wherein the materials are fluorocarbon compounds containing perfluoroalkylpolyoxyethyleneethanol.

8. The carriage assembly of claim 7 wherein the surface energy of said materials with low surface energy is in the range of 12–15 erg/cm$^2$.

9. The carriage assembly of claim 7 wherein the coating of said materials with low surface energy is in the range of 5–100 angstroms.

10. The carriage assembly of claim 7 wherein the coating of said materials with low surface energy is in the range of 10–20 angstroms.

11. A hard disk drive having a carriage assembly with a magnetic head selected from a group consisting of a read element and a write element, wherein the magnetic head has at least a part of a surface thereof coated with materials having a low surface energy; and wherein the materials are fluorocarbon compounds containing perfluoroalkylpolyoxyethyleneethanol.

12. The hard disk drive of claim 11 wherein the surface energy of said materials with low surface energy is in the range of 12–15 erg/cm$^2$.

13. The hard disk drive-in of claim 11 wherein the coating of said materials with low surface energy is in the range of 5–100 angstroms.

14. The hard disk drive of claim 11 wherein the coating of said materials with low surface energy is in the range of 10–20 angstroms.

* * * * *